United States Patent [19]
Neubert et al.

[11] Patent Number: 5,944,395
[45] Date of Patent: Aug. 31, 1999

[54] CONNECTOR ENDLESS TRACK WITH TRAVELLING PAD

[75] Inventors: Bernd Neubert; Klaus Spies, both of Remscheid; Kurt Schlupp, Solingen, all of Germany

[73] Assignee: Diehl Remscheid GmbH & Co., Germany

[21] Appl. No.: 08/840,381

[22] Filed: Apr. 29, 1997

[30] Foreign Application Priority Data

May 15, 1996 [DE] Germany .......................... 196 19 577

[51] Int. Cl.⁶ .................................................. B62D 55/28
[52] U.S. Cl. ......................... 305/188; 305/189; 305/196; 305/198
[58] Field of Search ................................ 305/46, 51, 185, 305/187, 188, 189, 191, 193, 195, 197, 198, 201, 111, 112, 113

[56] References Cited

U.S. PATENT DOCUMENTS

| | | | |
|---|---|---|---|
| 2,686,697 | 8/1954 | Baker | 305/51 X |
| 3,870,380 | 3/1975 | Korner | 305/188 X |
| 4,765,694 | 8/1988 | Cory | 305/51 X |

FOREIGN PATENT DOCUMENTS

| | | | |
|---|---|---|---|
| 0 255 071 B1 | 9/1994 | European Pat. Off. | |
| 14 80 744 | 3/1970 | Germany . | |
| 1 605 509 | 6/1970 | Germany . | |
| 2307634 | 8/1974 | Germany | 305/189 |
| 2657906 | 6/1978 | Germany | 305/51 |
| 1532420 | 12/1989 | U.S.S.R. | 305/188 |

*Primary Examiner*—Russell D. Stormer
*Attorney, Agent, or Firm*—Scully, Scott, Murphy & Presser

[57] ABSTRACT

In the case of a connector endless track with travelling pad, the invention aims to guarantee a long service life for the travelling pads (1). The load-bearing surface of the travelling pad (1) on the carriageway is reduced by the engagement of a tooth (25) of a drive ring (26) into a tube body (5) of the connector endless track. In order to provide a compensation effect here the travelling pad (1) is extended in a direction towards the opening (3) and covers at least a portion (2) of the surface region of the opening (3) for the engagement of a drive ring (26).

6 Claims, 3 Drawing Sheets

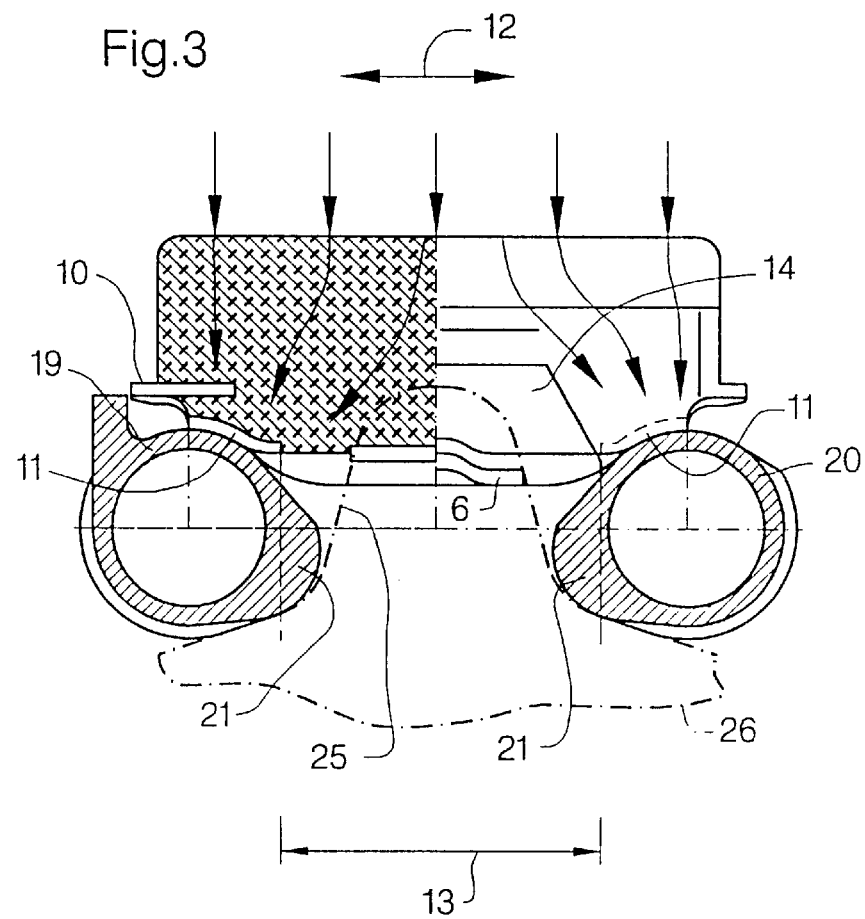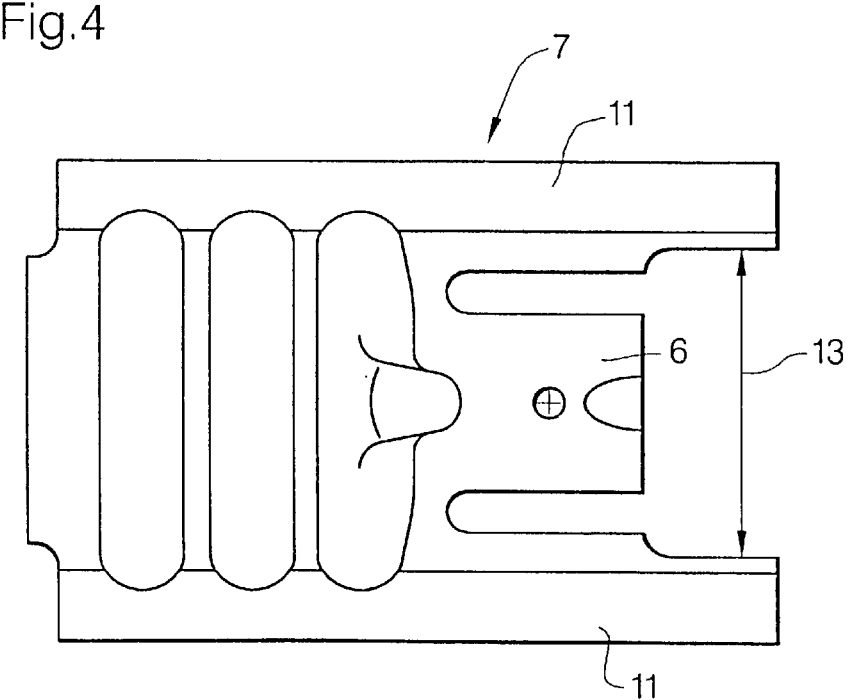

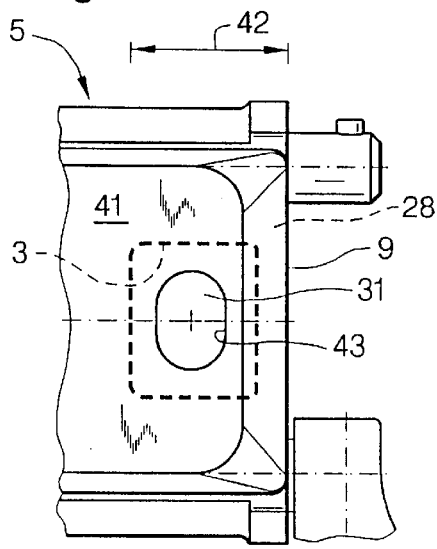
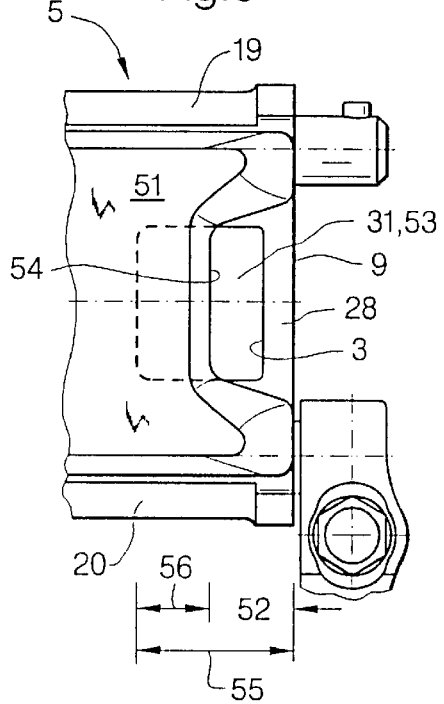
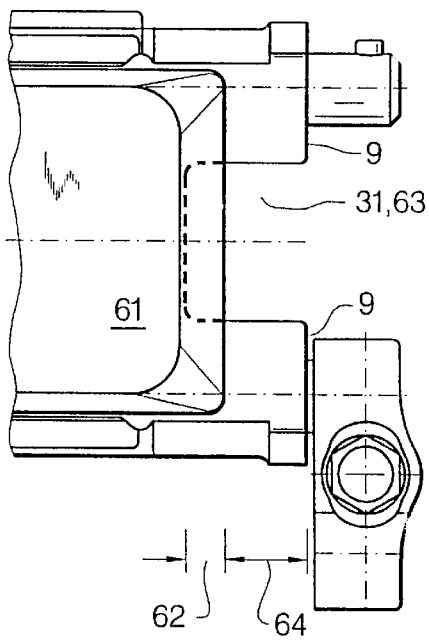
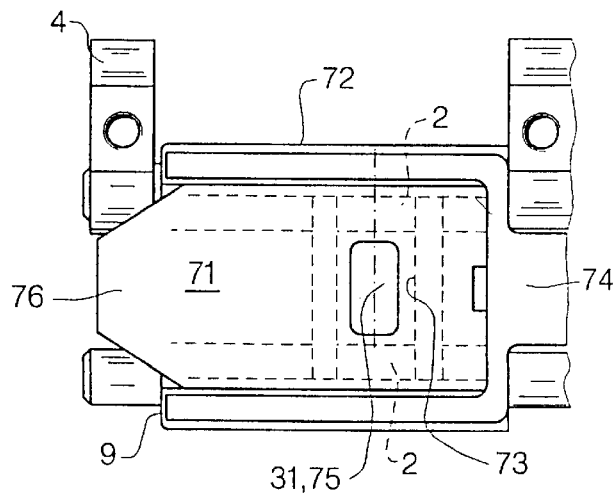

CONNECTOR ENDLESS TRACK WITH TRAVELLING PAD

BACKGROUND OF THE INVENTION

1. Field of the Invention

The invention concerns a connector endless track with travelling pad having a tubular body with at least one opening for the engagement therein of a tooth of a drive ring, and wherein such tubular bodies are provided on the side facing the carriageway with removable traveling pads, wherein the traveling pads which are comprised of an elastic, abrasion-resistant material are reinforced with at least one plate.

2. Discussion of the Prior Art

EP 0 255 071 B2 discloses a connector endless track with travelling pad, in which a tooth of a drive gear engages into an opening in the track body. In accordance with a first construction, the travelling pad is of a reduced-length configuration corresponding to the opening provided on the track body at the end, that is to say the travelling pad terminates at the end at the level of the opening. In accordance with a second construction the opening is not provided on the track body at the end but approximately in the centre of the tube body. That arrangement provides that a cut-out corresponding to the cross-section of the opening is disposed in the travelling pad.

It has been found with endless tracks of that kind that the service life of the travelling pads is markedly lower in comparison with that of travelling pads of tracks corresponding to German patent specification No 1 605 509. The reason for this lies in the smaller support surface area of the travelling pads.

SUMMARY OF THE INVENTION

The object of the present invention is to propose a connector endless track with travelling pads, in which the travelling pad has a long operating life.

According to the invention, the foregoing object is attained in that the traveling pad is extended in a direction towards the opening and covers at least a portion of the surface region of the opening.

By virtue of the increase in the size of the contact support surface the travelling pad is increased in length over the opening of the tube body for the engagement of the drive ring. The lower level of contact pressure in the rubber, which occurs as a result, provides for a lower level of wear due to a low rate of abrasion. Overheating of travelling pads is avoided, even on track-laying vehicles which are moving at high speed. Maximum speeds of travel are 80 to 90 kph in the case of track-laying vehicles of that kind.

DETAILED DESCRIPTION OF PREFERRED EMBODIMENTS

Embodiments of the invention are illustrated in the drawing in which:

FIG. 3 is a view in section on line III—III in FIG. 1,

FIG. 4 shows a base plate of the travelling pad as shown in FIGS. 1 to 3, and

FIGS. 5 to 8 show variations of travelling pads and tube bodies, in relation to FIG. 1.

Figure 1:
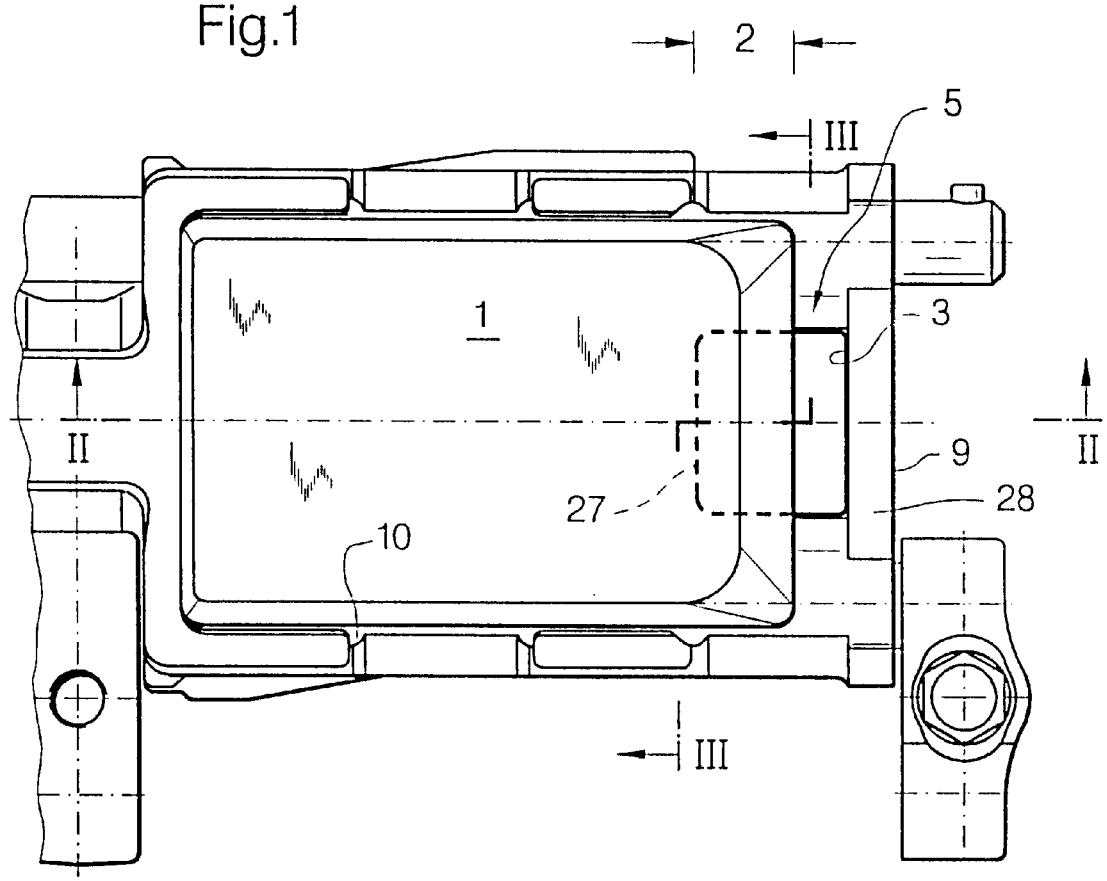
FIG. 1 shows a tube body with travelling pad.

Referring to FIG. 1, an insertable travelling pad 1 extends over a portion 2 of an opening 3 of a tube body 5.

The travelling pad 1 is arrested in the tube body 5 by way of a resilient tongue 6 of a base plate 7, by means of a projection 8. The base plate 7 is joined to the travelling pad 1 by vulcanisation. The travelling pad 1 also has an intermediate plate 10 which is secured in position by vulcanisation.

Figure 2:
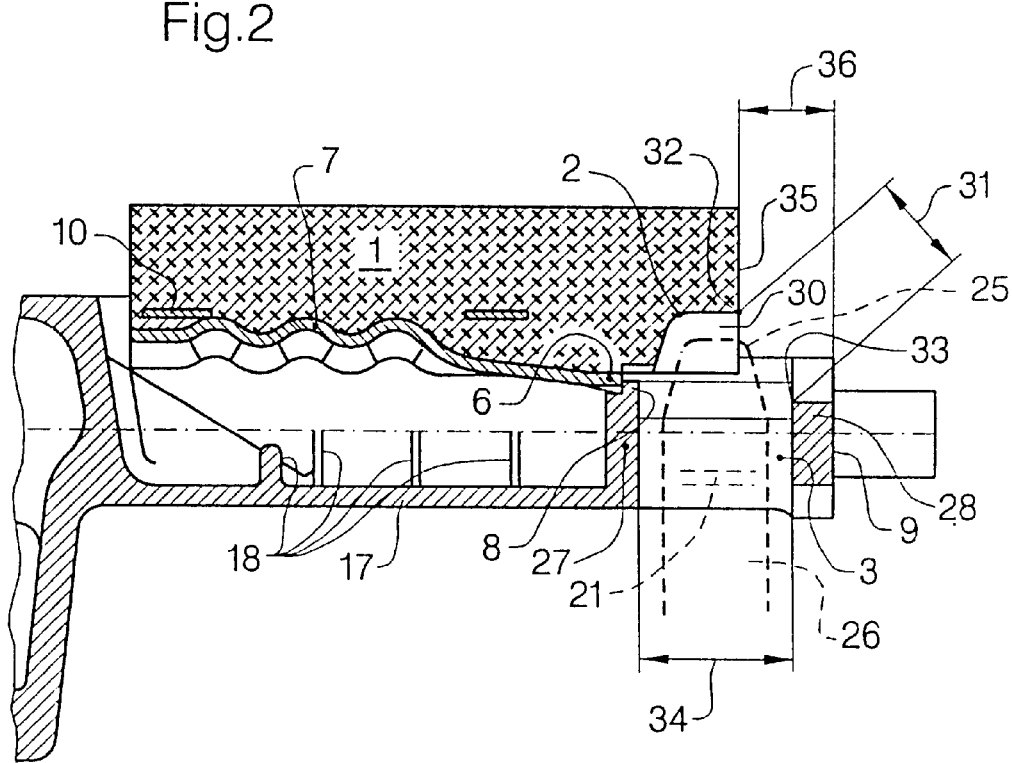
FIG. 2 is a view in section on line II—II in FIG. 1.

As shown in FIGS. 1 to 3 the tube body 5 comprises two tubes 19, 20 which are connected by way of a plate 17 with transverse ribs 18.

The opening 3 for engagement of the tooth 25 of a drive ring or rim 26 is defined by the tubes 19, 20 with drive cams 21 and by web portions 27, 28. The base plate 7 has two limbs 11 which support the travelling pad 1 on the tubes 19, 20.

Provided on the travelling pad 1 in the region of the opening 3 is a recess 30 for the free movement of the tooth 25 of the drive ring 26. The recess 30 permits self-cleaning of the opening 3. The travelling pad 1 lies with its end face 35 at a spacing 36 from an end face 9 of the tube body 5 so that about two-thirds of the opening 3 are covered.

In the travel direction as indicated at 12 the recess 30 is of a base width 13 which extends between the two limbs 11. The recess 30 is of a trapezoidal shape 14.

A passage 31 between an edge 32 on the travelling pad 1 and an edge 33 on the web portion 28 is of approximately the same size as the width 34 of the opening 3.

If the passage 31 is smaller than the width 34 of the opening 3, the travelling pad of rubber can deflect in the region of the edge 32 by virtue of elastic deformation if an object which causes a nuisance such as a stone is pressed by the tooth 25 of the drive ring 26 through the opening 3 of the tube body 5.

As shown in FIG. 5 a travelling pad 41 extends with a portion 42 completely over the opening 3 and more especially as far as the end surface 9 on the web portion 28. The travelling pad 41 has a through aperture 43 as a passage 31, communicating with the opening 3 for the self-cleaning effect.

As shown in FIG. 6 a travelling pad 51 extends in respect of a portion 55 as far as the end face 9 of the web portion 20 only in the region of the tubes 19, 20. A central portion 56 of the travelling pad 51 is set back by a spacing 52 in such a way that the arrangement affords an adequate passage 31 or opening cross-section 53 to provide the self-cleaning effect. That opening cross-section 53 is defined on the one hand by the opening 3 and on the other hand by the set-back surface 54 of the travelling pad 51.

Referring to FIG. 7, a good self-cleaning action is achieved by omission of the web portion 28. By virtue of that configuration, there is a U-shaped opening 63 for forming a passage 31. A travelling pad 61 covers over the opening 63, corresponding to a distance 62, and is at a spacing 64 relative to the end surface 9.

The travelling pad may also extend as far as the end surface 9 of the tube body 5.

As shown in FIG. 8 a travelling pad 71 extends beyond a tube body 72 to a position between the connectors 4. An opening 73 is disposed near a central plate 74 of the tube body 72. A through opening 75 in the travelling pad 71 forms the passage 31. The load-bearing surface 76 of the travelling pad is increased by a reduction in respect of cross-section of the through opening 75 with respect to the opening 73.

We claim:

1. A connector endless track-laying chain including traveling pads (1) and having tubular bodies (5) each having at least one opening (3) for the engagement therein of a tooth (25) of a drive ring (26), said traveling pads (1) being removably disposed on said tubular bodies (5) and being constituted of an elastic, abrasion-resistant material and reinforced by at least one plate (7,10), each said traveling pad (1) being extended in length in a direction towards an associated said opening (3) and covering about 30 to 100% of the opening (3).

2. The connector endless track-laying chain according to claim 1, wherein the tubular body (5) has a free end surface, and the traveling pad (1) extends to said free end surface (9) of the tubular body (5).

3. The connector endless track-laying chain according to claim 1, wherein the tubular body (5) has a free end surface, and the traveling pad (1, 51, 61) terminates at a distance (36, 52, 64) from said free end surface (9) of the tubular body (5) to form a passageway (31) for the removal of dirt.

4. The connector endless track-laying chain according to claim 1, wherein said plate (7) has arm portions and the extended portion (2, 42, 55, 62) of the traveling pad (1, 41, 51, 61) is reinforced by said arm portions (11).

5. A connector endless track-laying chain including traveling pads (1) and having tubular bodies (5) each having at least one opening (3) for the engagement therein of a tooth (25) of a drive ring (26), said traveling pads (1) being removably disposed on said tubular bodies (5) and being constituted of an elastic, abrasion-resistant material and reinforced by at least one plate (7,10), each said traveling pad (1) being extended in length in a direction towards an associated said opening (3) and covering at least a portion (2) of the surface region of the opening (3), wherein each said traveling pad has a recess (30) in an underside thereof for a free movement of the tooth (25) of the drive ring (26).

6. A connector endless track-laying chain including traveling pads (1) and having tubular bodies (5) each having at least one opening (3) for the engagement therein of a tooth (25) of a drive ring (26), said traveling pads (1) being removably disposed on said tubular bodies (5) and being constituted of an elastic, abrasion-resistant material and reinforced by at least one plate (7,10), each said traveling pad (1) being extended in length in a direction towards an associated said opening (3) and covering at least a portion (2) of the surface region of the opening (3), wherein the traveling pad (1) has a through-aperture (43) formed therein for the removal of dirt, and the aperture (43) is in correspondence with the opening (3).

* * * * *